US009626779B1

(12) United States Patent
Inoue

(10) Patent No.: US 9,626,779 B1
(45) Date of Patent: Apr. 18, 2017

(54) EFFICIENT BACK-PROJECTION OPERATION USING PRECOMPUTED TABLE

(71) Applicant: INTERNATIONAL BUSINESS MACHINES CORPORATION, Armonk, NY (US)

(72) Inventor: Hiroshi Inoue, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/887,733

(22) Filed: Oct. 20, 2015

(51) Int. Cl.
  *G06T 11/00* (2006.01)
  *G06T 15/08* (2011.01)
  *G06F 17/24* (2006.01)

(52) U.S. Cl.
  CPC .......... *G06T 11/008* (2013.01); *G06F 17/245* (2013.01); *G06T 11/003* (2013.01); *G06T 11/005* (2013.01); *G06T 11/006* (2013.01); *G06T 15/08* (2013.01); *G06T 2207/10081* (2013.01)

(58) Field of Classification Search
  CPC .... G06T 11/003; G06T 11/005; G06T 11/006; G06T 11/008; G06T 15/08; G06T 2207/10081; G06F 17/245
  See application file for complete search history.

(56) References Cited

U.S. PATENT DOCUMENTS

| 5,128,864 | A | * | 7/1992 | Waggener | ............ | G06T 11/006 378/14 |
| 5,606,585 | A | * | 2/1997 | Hu | ......... | A61B 6/032 378/15 |
| 7,676,018 | B2 | * | 3/2010 | Grass | ..................... | A61B 6/032 378/4 |
| 8,107,592 | B2 | | 1/2012 | Berman et al. | | |
| 8,913,805 | B2 | | 12/2014 | Long et al. | | |
| 2011/0150308 | A1 | * | 6/2011 | Thibault | ............... | G06T 11/006 382/131 |
| 2011/0299652 | A1 | * | 12/2011 | Partain | ................... | A61B 6/032 378/4 |
| 2012/0189158 | A1 | * | 7/2012 | Berman | ............... | G06T 11/006 382/100 |

* cited by examiner

*Primary Examiner* — Jacinta M Crawford
*Assistant Examiner* — Phuc Doan
(74) *Attorney, Agent, or Firm* — Tutunjian & Bitetto, P.C.; Vazken Alexanian

(57) ABSTRACT

A method and system are provided. The method includes pre-computing, by a computing device having a processor, a plurality of coefficients for a given two-dimensional point on which a voxel of a three-dimensional object is projected, based on integer parts of coordinates of surrounding two-dimensional points with respect to the given two-dimensional point. The plurality of coefficients lack inclusion of the coordinates. The method further includes storing, by a non-transitory storage device, the plurality of coefficients. The method additionally includes computing, by the computing device during a back-projection operation that forms a reconstructed three-dimensional image, an intensity value at the given two-dimensional point. The computing device computes the intensity value by reading the plurality of coefficients from the non-transitory storage device and combining the plurality of coefficients with the coordinates.

16 Claims, 8 Drawing Sheets

EFFICIENT BACK-PROJECTION OPERATION USING PRECOMPUTED TABLE

BACKGROUND

Technical Field

The present invention relates generally to information processing and, in particular, to an efficient back-projection operation using a precomputed table.

Description of the Related Art

Three-dimensional (3D) Cone-Beam Computed Tomography (CBCT) is one of the most important and computationally-intensive medical imaging applications.

In CBCT and other medical imaging applications, a projection image data set is used as an intermediate product in order to reconstruct, via back-projection, the three-dimensional, internal structure of an imaged subject (e.g., a part of a body, and so forth). The projection image data set is a series of projection images of the object that were acquired at different projection angles in an image plane situated opposite the projection origin.

Volume imaging is achieved by first acquiring a series of cone beam projections of the object, where the beam source moves along some trajectory around the object, and then reconstructing the object from these projections, using a computer that executes a reconstruction algorithm. The reconstructed image consists of a 3D array of volume elements, or voxels. The reconstructed image represents a discrete approximation to the spatial distribution of the x-ray attenuation coefficient within a 3D region of the object. The coordinates of the voxels with respect to a reference frame are precisely known.

The core operation of the CBCT is the back-projection operation, which maps each voxel in the 3D volume onto the (2D) projection image.

In back-projection, the voxel, whose 3D position is denoted by $\{x, y, z\}$, is projected onto the point $\{u_n, v_n\}$ in the projection image data as follows:

$$u_n(x,y,z) = (a_0 x + a_3 y + a_6 z + a_9) \cdot w_n(x,y,z)^{-1},$$

$$v_n(x,y,z) = (a_1 x + a_4 y + a_7 z + a_{10}) \cdot w_n(x,y,z)^{-1},$$

$$w_n(x,y,z) = a_2 x + a_5 y + a_8 z + a_{11}$$

where $A_n$ is a transformation matrix determined by the radiation detector in a CBCT system, $a_0$ through $a_n$ are values in the transformation matrix, and $w_n$ denotes the angle of rotation of the beam source and the detector.

The intensity value at the point $\{u_n, v_n\}$, namely $\hat{p}_n$, is calculated from the intensity values $p_n$ at the surrounding four grid points by bi-linear interpolation as follows:

$$\hat{p}_n(u_n, v_n) = (1-\alpha)(1-\beta) p_n(i,j) + \alpha(1-\beta) p_n(i+1,j) + (1-\alpha) \beta p_n(i,j+1) + \alpha \beta p_n(i+1,j+1), i = \lfloor u_n \rfloor, j = \lfloor v_n \rfloor, \alpha = u_n - \lfloor u_n \rfloor, \beta = v_n - \lfloor v_n \rfloor$$

However, the preceding operation performed during the back-projection operation is computationally expensive. Accordingly, there is a need for accelerating the back-projection operation (e.g., in CBCT and other medical imaging applications) by reducing the amount of computation required to project voxels onto a projection image.

SUMMARY

According to an aspect of the present principles, a method is provided. The method includes pre-computing, by a computing device having a processor, a plurality of coefficients for a given two-dimensional point on which a voxel of a three-dimensional object is projected, based on integer parts of coordinates of surrounding two-dimensional points with respect to the given two-dimensional point. The plurality of coefficients lack inclusion of the coordinates. The method further includes storing, by a non-transitory storage device, the plurality of coefficients. The method additionally includes computing, by the computing device during a back-projection operation that forms a reconstructed three-dimensional image, an intensity value at the given two-dimensional point. The computing device computes the intensity value by reading the plurality of coefficients from the non-transitory storage device and combining the plurality of coefficients with the coordinates.

According to another aspect of the present principles, a system is provided. The system includes a computing device having a processor for pre-computing a plurality of coefficients for a given two-dimensional point on which a voxel of a three-dimensional object is projected, based on integer parts of coordinates of surrounding two-dimensional points with respect to the given two-dimensional point. The plurality of coefficients lack inclusion of the coordinates. The system further includes a non-transitory storage device for storing the plurality of coefficients. The computing device computes, during a back-projection operation that forms a reconstructed three-dimensional image, an intensity value at the given two-dimensional point, by reading the plurality of coefficients from the non-transitory storage device and combining the plurality of coefficients with the coordinates.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to an efficient back-projection operation using a precomputed table.

Figure 1:
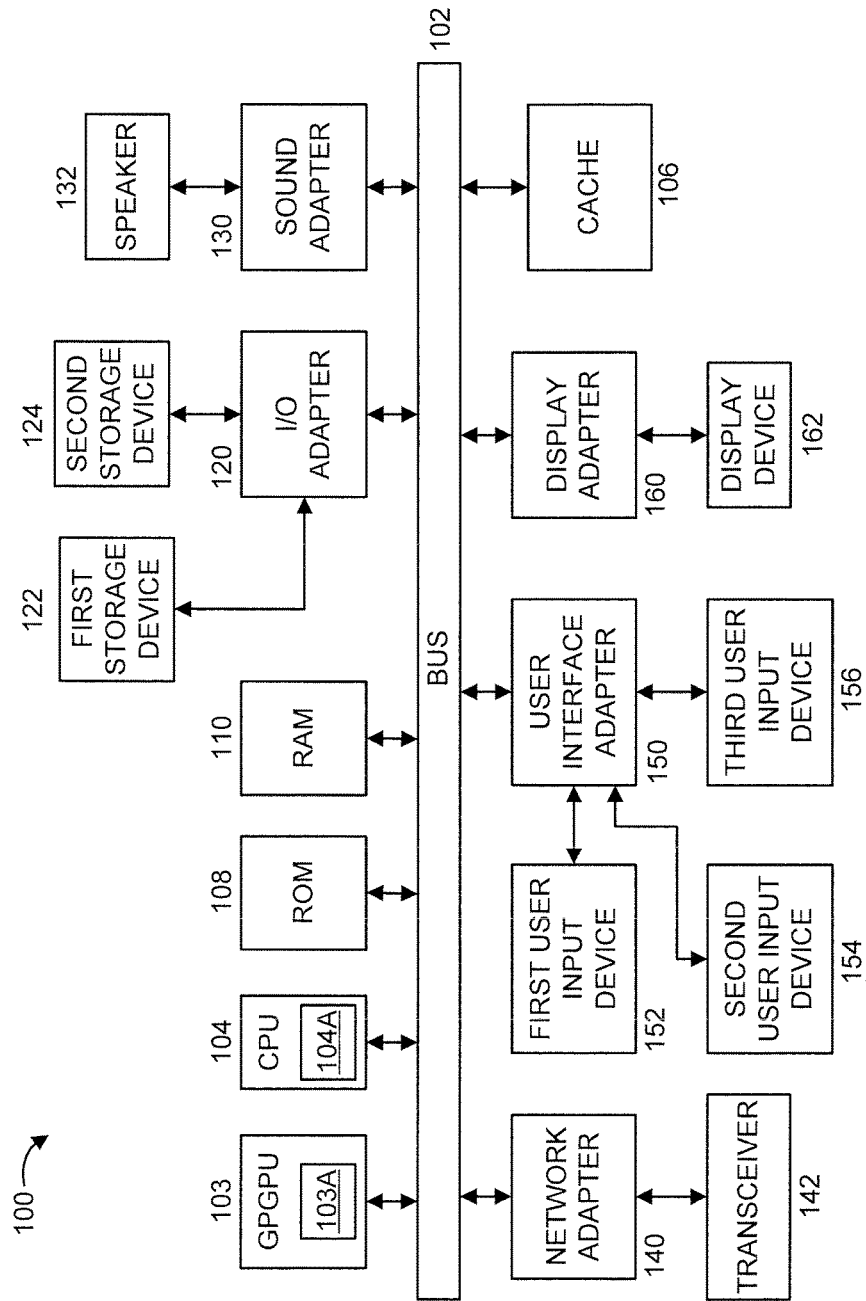
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 and a GPGPU 103 operatively coupled to other components via a system bus 102. One or more caches (collectively denoted by the reference numeral 106), a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. While cache 106 is intended to represent an off-chip cache, CPU 104 can have one or more on-chip caches (e.g., L1, L2, etc., collectively denoted by the reference numeral 104A). Moreover, GPGPU 103 includes one or more on-chip caches (collectively denoted by the reference numeral 103A).

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
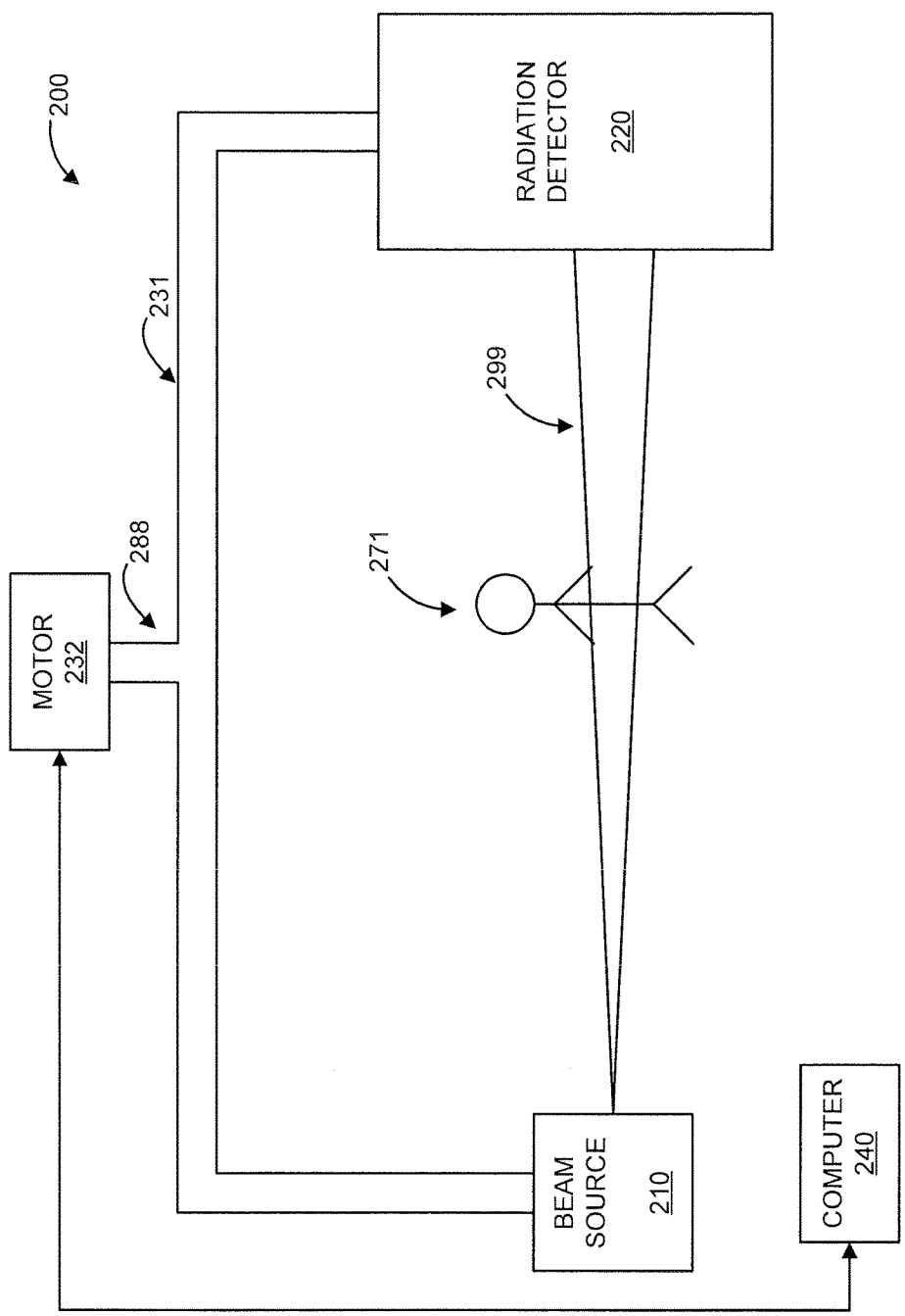
FIG. 2 shows an exemplary Cone-Beam Computer Tomography system (CBCT) to which the present principles can be applied, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
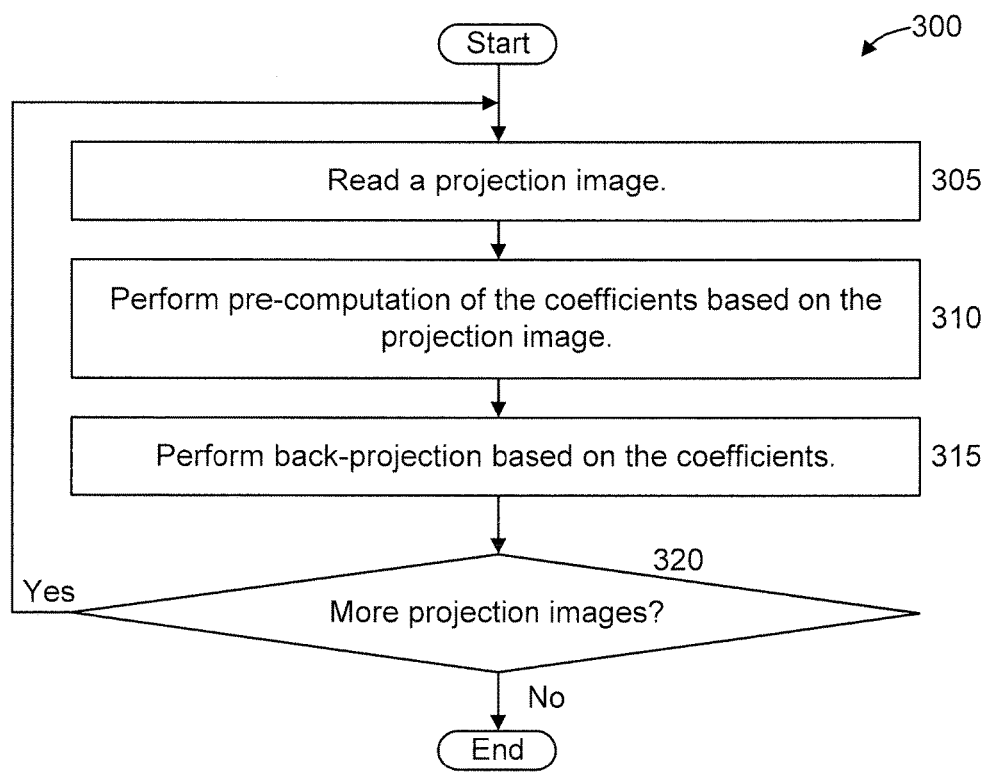
FIG. 3 shows an exemplary method 300 for an efficient back-projection operation using a pre-computed table, in accordance with an embodiment of the present principles.
Figure 4:
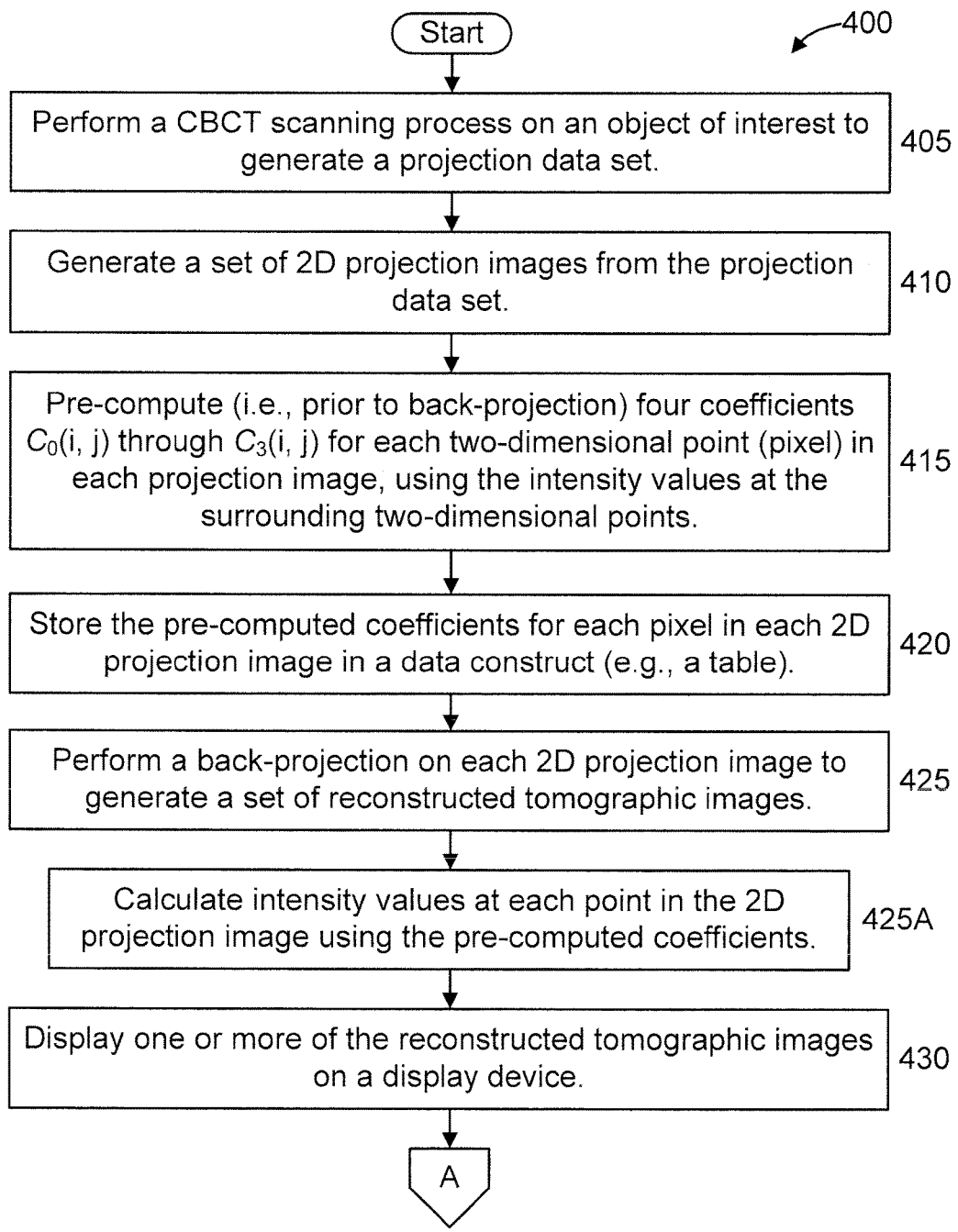
FIGS. 4-5 show another exemplary method 400 for an efficient back-projection operation using a pre-computed table, in accordance with an embodiment of the present principles.
Figure 5:
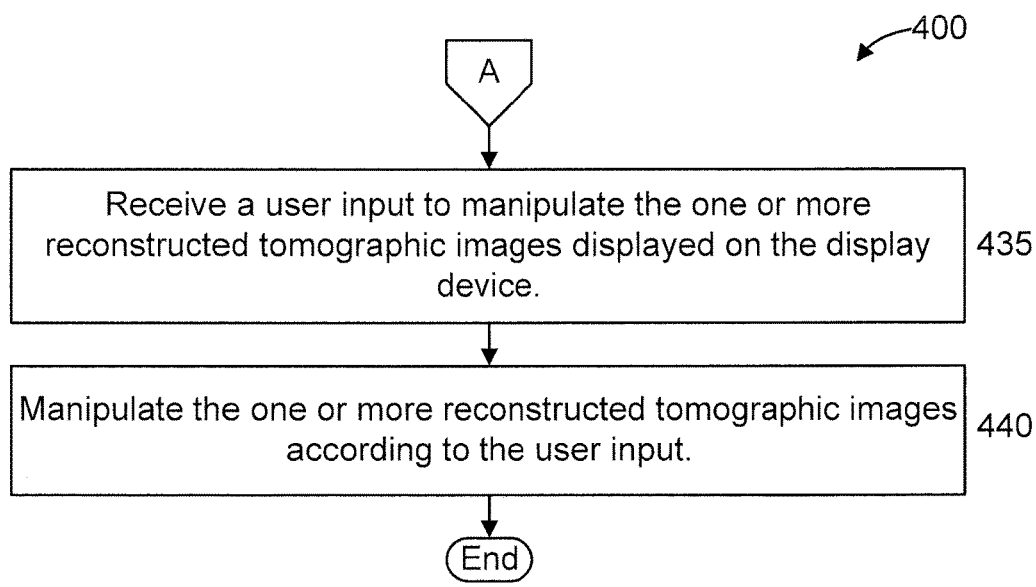

Further, it is to be appreciated that processing system 100 may perform at least part of the method described herein including, for example, at least part of method 300 of FIG. 3 and/or at least part of method 400 of FIGS. 4-5. Similarly, part or all of system 200 may be used to perform at least part of method 300 of FIG. 3 and/or at least part of method 400 of FIGS. 4-5.

FIG. 2 shows an exemplary Cone-Beam Computer Tomography (CBCT) system 200 to which the present principles can be applied, in accordance with an embodiment of the present principles.

The CBCT system 200 includes a beam source 210, a radiation detector 220, a rotational device 230, and a computer 240.

The beam source 210 provides a radiation source for emitting x-ray radiation in a conical beam 299.

The radiation detector 220 detects the x-ray radiation emitted by the beam source 210. To that end, the radiation detector 220 can include, for example, an image intensifier coupled to a charge coupled device (CCD) array or a flat-panel solid-state detector. The present principles are not limited to any particular detection technology and, thus, any detection technology can be used, while maintaining the spirit of the present principles.

The rotational device 230 is attached to and rotates the beam source 210 and the radiation detector 220 in a trajectory around an object of interest 271 to capture multiple projections of the object of interest. By rotating the beam, e.g., around a fixed point in the object of interest, and acquiring projections from many different angles, a three-dimensional volume can be reconstructed. Often, the rotational device 230 includes a C-arm 231 or other structural member to secure the beam source 210 and the radiation detector for rotation, and a motor 232 to rotate the C-arm along a rotational axis 288.

The computer 240 controls the elements of system 200. For example, the computer 240 activates the beam source 210 and detector 220, and controls the rotation of the rotation device 230. Wiring for such control can be within the C-arm 231 or in some other arrangement. The computer 240 includes a processor 240A and a memory 240B. The processor 240A initiates the controlling of the other elements. The memory 240B stores the captured images and other data generated during a scanning process performed by the CBCT system 200.

The memory 240B also stores software for the scanning process and the data reconstruction process. The scanning process collects data from the object of interest and the reconstruction process reconstructs the data into a 3D digital volume composed of three-dimensional voxels of anatomical data that can be visualized and manipulated on a display 240C of the computer using one or more user interface devices 240D. A primary operation of the CBCT system 200 is the back-projection operation, which maps each voxel in the 3D digital volume onto a 2D projection image. The back-projection operation is a very computationally intensive operation. Advantageously, the present principles provide a way to accelerate the back-projection (e.g., in CBCT and other medical imaging applications) by reducing the amount of computation required to projects the voxels onto a 2D projection image.

FIG. 3 shows another exemplary method 300 for an efficient back-projection operation using a pre-computed table, in accordance with an embodiment of the present principles. The method 300 corresponds to the case of multiple projection images. Method 300 is shown in simplified form, as method 400 shows further details relating to an embodiment of the present principles.

At step 305, read a projection image.

At step 310, perform pre-computation of the coefficients based on the projection image.

At step 315, perform back-projection based on the coefficients.

At step 320, determine whether there are any more projection images. If so, then the method returns to step 305 to read the next projection image. Otherwise, the method is terminated.

FIGS. 4-5 show an exemplary method 400 for an efficient back-projection (CBCT) operation using a pre-computed table, in accordance with an embodiment of the present principles. While method 400 is described with respect to CBCT, the present principles can be applied to any medical imaging or other application that involves a back-projection operation, while maintaining the spirit of the present principles.

At step 405, perform a CBCT scanning process on an object of interest to generate a projection data set.

The projection data set includes data representative of, or from which can be derived, intensity values. The projection data set also includes positional data relating to positioning of the CBCT system elements (e.g., beam source 210 and detector 220) relative to the object of interest. The positional data can be represented, at least in part, in a transformation matrix $A_n$. The transformation matrix $A_n$ corresponds to a particular projection angle of the beam emitted by the beam source 210 during the scanning process. In the case of multiple projection angles (of the beam emitted by the beam source 210) being used during the scanning, there can be multiple transformation matrices, each corresponding to a respective projection angle of the beam.

At step 410, generate a set of 2D projection images from the projection data set. Any technique can be used for form the set of 2D projection images from the projection data set.

At step 415, pre-compute (i.e., prior to back-projection) four coefficients $C_0(i, j)$ through $C_3(i, j)$ for each two-dimensional point (pixel) in each projection image, using the intensity values at the surrounding two-dimensional points.

Each of the coefficients corresponds to a respective combination of the respective intensities of the surrounding two-dimensional points. Each of the coefficients is precomputed from integer parts of coordinates of the surrounding two-dimensional points. The coefficients lack inclusion of the coordinates (of the surrounding two-dimensional points), that is, the coefficients do not include the actual coordinates.

In an embodiment, for a given two-dimensional point $\{u_n, v_n\}$, coefficient $C_0(i, j)$ is computed from the underlined portion of the following equation as follows:

$$C_0(i,j) = u_n v_n (p_n(i,j) + p_n(i+1,j+1) - p_n(i+1,j) - p_n(i,j+1))$$

In an embodiment, coefficient $C_1(i, j)$ is computed from the underlined portion of the following equation as follows:

$$C_1(i,j) = u_n((j+1)(p_n(i+1,j) - p_n(i,j)) + j(p_n(i,j+1) - p_n(i+1,j+1)))$$

In an embodiment, coefficient $C_2(i, j)$ is computed from the underlined portion of the following equation as follows:

$$C_2(i,j) = v_n((i+1)(p_n(i,j+1) - p_n(i,j)) + i(p_n(i+1,j) - p_n(i+1,j+1)))$$

In an embodiment, coefficient $C_3(i, j)$ is computed from the underlined portion of the following equation as follows:

$$C_3(i,j) = ((i+1)(j+1)p_n(i,j) + ij p_n(i+1,j+1) - (i+1)j p_n(i,j+1) - i(j+1)p_n(i+1,j))$$

At step 420, store the pre-computed coefficients for each pixel in each 2D projection image in a data construct (e.g., a table). One or more data constructs (e.g., tables) can be used. For example, the table can include the pre-computed coefficients for a given point, for a given 2D projection image, or for all 2D projection images in the set. In an embodiment, step 420 involves storing the pre-computed coefficients for each pixel in a 2D projection image in one cache line, to reduce the number of cache lines accessed per voxel.

At step 425, perform a back-projection on each 2D projection image to generate a set of reconstructed tomographic images.

In an embodiment, step 425 includes computing an intensity value at a given two-dimensional point (pixel) on which a voxel of a three-dimensional object (the object of interest scanned in step 405) is projected, based on intensity values at surrounding two-dimensional points with respect to the given two-dimensional point. In step 425, the intensity values at the surrounding two-dimensional points are represented by and/or otherwise calculated from, the coefficients pre-computed at step 415.

In embodiment, four surrounding two-dimensional points are used for each pixel in step 425. However, in other embodiments, given the teachings of the present principles provided herein, different numbers of two-dimensional points can be used, while maintaining the spirit of the present principles.

Thus, in an embodiment, the back-projection performed in step 425 includes step 425A.

At step 425A, calculate intensity values at each point in the 2D projection image using the pre-computed coefficients.

In an embodiment, the intensity value at a given two-dimensional point is calculated by reading the plurality of coefficients for that two-dimensional point from the memory 240B and combining the plurality of coefficients with the coordinates for the surrounding two-dimensional points corresponding thereto.

In an embodiment, step 425A is performed using the following equation to calculate the intensity value at each point:

$$\hat{p}_n(u_n, v_n) = u_n v_n C_0(i,j) + u_n C_1(i,j) + v_n C_2(i,j) + C_3(i,j).$$

In another embodiment, step 425A is performed using the following equation to calculate the intensity value at each point:

$$\hat{p}_n(u_n, v_n) = u_n(v_n C_0(i,j) + C_1(i,j)) + v_n C_2(i,j) + C_3(i,j).$$

Moreover, in an embodiment, at least step 425A is performed using Single Instruction Multiple Data (SIMD) instructions to avoid scattered or unaligned memory accesses for the pre-computed coefficients.

At step 430, display one or more of the reconstructed tomographic images on a display device.

At step 435, receive a user input to manipulate the one or more reconstructed tomographic images displayed on the display device. The user input can be for one or more of the following operations: changing a contrast value; selecting a cross-section to display on a (2D) display; zooming into a specific detail or area; zooming out from a specific detail or area; and so forth. In the case of multiple reconstructed tomographic images, the operations can also include switching between different ones of the reconstructed tomographic images, placing at least two of the reconstructed tomographic images side by side for a comparison, and overlaying at least one reconstructed tomographic image on another reconstructed tomographic image. The preceding operations are merely illustrative and, thus, other operations can also be performed on the reconstructed tomographic image(s), while maintaining the spirit of the present principles.

At step 440, manipulate the one or more reconstructed tomographic images according to the user input.

Thus, to minimize the computation in the back-projection operation, the following four coefficients $C_0$ through $C_3$ are pre-computed for each pixel in each projection image and the values are stored in a table as follows:

$$\hat{p}_n(u_n, v_n) = (1-\alpha)(1-\beta)p_n(i, j) +$$
$$\alpha(1-\beta)p_n(i+1, j) + (1-\alpha)\beta p_n(i, j+1) + \alpha\beta p_n(i+1, j+1) =$$
$$u_n v_n(p_n(i, j) + p_n(i+1, j+1) - p_n(i+1, j) - p_n(i, j+1)) +$$
$$u_n((j+1)(p_n(i+1, j) - p_n(i, j)) + j(p_n(i, j+1) - p_n(i+1, j+1))) +$$
$$v_n((i+1)(p_n(i, j+1) - p_n(i, j)) + i(p_n(i+1, j) - p_n(i+1, j+1))) +$$
$$((i+1)(j+1)p_n(i, j) + ijp_n(i+1, j+1) -$$
$$(i+1)jp_n(i, j+1) - i(j+1)p_n(i+1, j)) =$$
$$u_n v_n C_0(i, j) + u_n C_1(i, j) + v_n C_2(i, j) + C_3(i, j) =$$
$$u_n(v_n C_0(i, j) + C_1(i, j)) + v_n C_2(i, j) + C_3(i, j)$$

The underlining in the immediately preceding equation is used to show the respective portions of the equation from which the coefficients, $C_0(i,j)$, $C_1(i,j)$, $C_2(i,j)$, and $C_3(i,j)$, are calculated.

In particular, the coefficient $C_0(i,j)$ is calculated from the first underlined portion in the immediately preceding equation, namely:

$$C_0(i,j) = u_n v_n(p_n(i,j) + p_n(i+1,j+1) - p_n(i+1,j) - p_n(i,j+1))$$

In particular, the coefficient $C_1(i,j)$ is calculated from the second underlined portion in the immediately preceding equation, namely:

$$C_1(i,j) = u_n((j+1)(p_n(i+1,j) - p_n(i,j)) + j(p_n(i,j+1) - p_n(i+1, j+1)))$$

In particular, the coefficient $C_2(i,j)$ is calculated from the third underlined portion in the immediately preceding equation, namely:

$$C_2(i,j) = v_n((i+1)(p_n(i,j+1) - p_n(i,j)) + i(p_n(i+1,j) - p_n(i+1, j+1)))$$

In particular, the coefficient $C_3(i,j)$ is calculated from the fourth underlined portion in the immediately preceding equation, namely:

$$C_3(i,j) = ((i+1)(j+1)p_n(i,j) + ijp_n(i+1,j+1) - (i+1)jp_n(i,j+1) - i(j+1)p_n(i+1,j))$$

During the back-projection operation, we access $C_0$ through $C_3$ instead of $p_n$ from the projection image to calculate $\hat{p}_n(u_n, v_n)$.

The new formula requires only three arithmetic (multiply-and-add) instructions to calculate $\hat{p}_n(u_n, v_n)$, while the original formula requires twelve arithmetic instructions.

It is to be appreciated that the 2D projection image can be considered to form a grid and/or otherwise is formed with respect to a grid. Hence, the present principles can transform an interpolation formula for an intensity at a non-grid point (u,v) from the values of surrounding grid points (e.g., four surrounding grid points) in the following form:

$$p(u, v) = \sum_{q=0}^{m} \sum_{r=0}^{m} u^q v^r C_{q,r}$$

where p(u,v) denotes the intensity at the non-grid point (u,v), $u^q$ denotes the $q^{th}$ power of u, $v^r$ denotes the $l^{th}$ power of v, and $C_{q,r}$ denotes a coefficient, where $C_{q,r}$ does not include u or v.

The intention of this equation is a generalization to expand the present principles to use a $(m+1)^{th}$ order interpolation algorithm. In the above embodiment, we assume bi-linear ($2^{nd}$ order) interpolation and hence m=1. We need to precompute (m+1)*(m+1) values per pixel. For m=1, we have four coefficients called $C_0$ to $C_3$ above. They correspond to $C_{1,1}$, $C_{1,0}$, $C_{0,1}$, and $C_{0,0}$ of this equation.

A description will now be given regarding some of the many attendant advantages of the present principles. One advantage of the present principles is that they accelerate the computationally intensive back-projection loop. The back-projection loop is accelerated by reducing the number of required arithmetic instructions. The back-projection loop is further accelerated by reducing the number of cache lines accessed per voxel. For example, $p_n(i,j)$, $p_n(i+1, j)$ and $p_n(i,j+1)$, $p_n(i+1,j+1)$ are on the different cache lines, while we can pack $C_0(i,j)$ through $C_3(i,j)$ into one cache line. Moreover, the present principle are efficient with Single Instruction Multiple Data (SIMD) instructions because we can avoid scattered or unaligned memory accesses.

A description will now be given regarding some considerations implicated by one or more embodiments of the present principles. In some embodiments, the present principles may cause additional overheads in computation time and memory space to create and store the precomputed table. However, it is to be appreciated that the overhead in the computation time is not significant because it is proportional to the size of one projection image, while the time for the back-projection loop is proportional to the size of the 3D volume. Moreover, the additional memory area is typically much smaller than the computed results for each voxel.

A description will now be given regarding some exemplary applications to which the present principles can be applied, in accordance with various embodiments of the present principles.

It is to be appreciated that the present principles can be applied to any application that executes interpolation from data points defined on grid points, such as, but not limited to, particle simulations.

Moreover, it is to be appreciated that the present principles are not limited to a 2D grid (e.g., projection data). In an embodiment, the number of values (i.e., coefficients) to compute per pixel is 2N on an N-dimensional grid.

Additionally, it is to be appreciated that the present principles are not limited to bi-linear interpolation. In an embodiment, for an $m^{th}$ order polynomial (e.g., Langrange interpolation), the number of values to compute per pixel is (m+1)N for an N-dimensional grid. Linear interpolation refers to the case where m=1.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
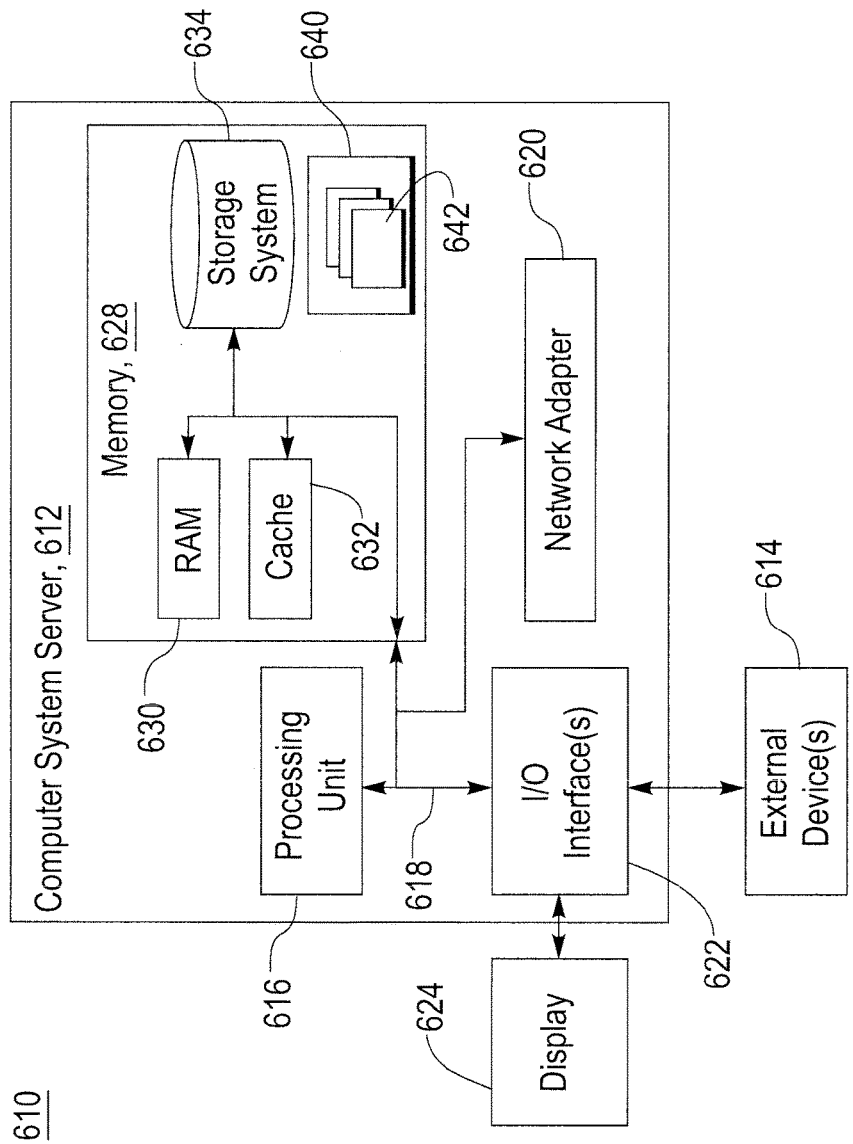
FIG. 6 shows an exemplary cloud computing node 610, in accordance with an embodiment of the present principles.

Referring now to FIG. 6, a schematic of an example of a cloud computing node 610 is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
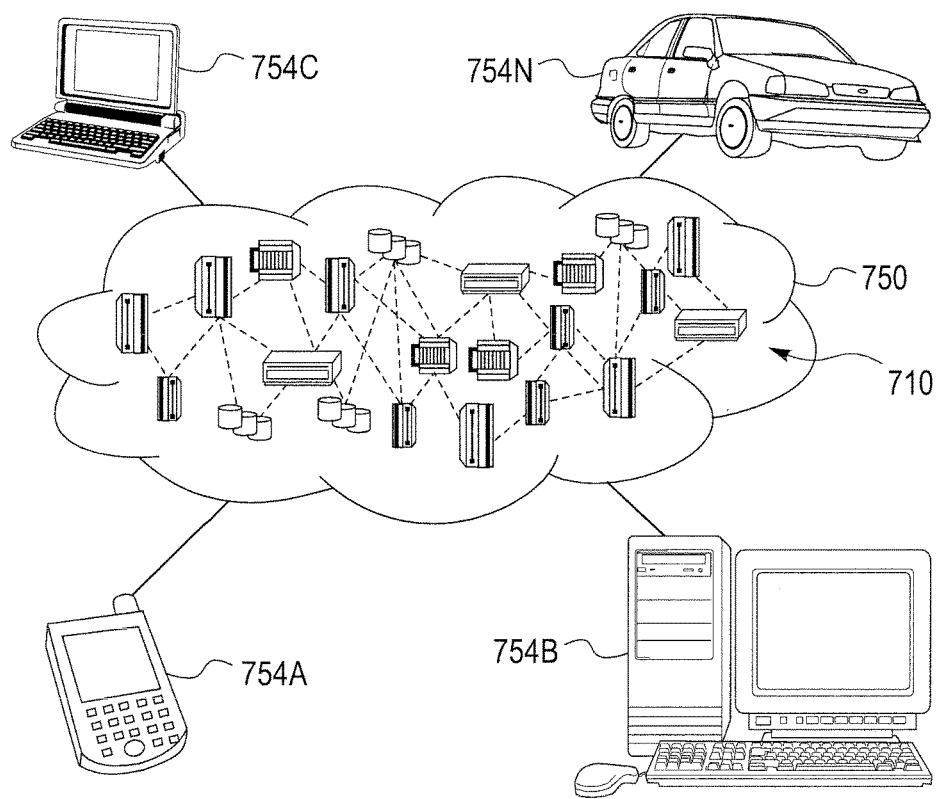
FIG. 7 shows an exemplary cloud computing environment 750, in accordance with an embodiment of the present principles.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
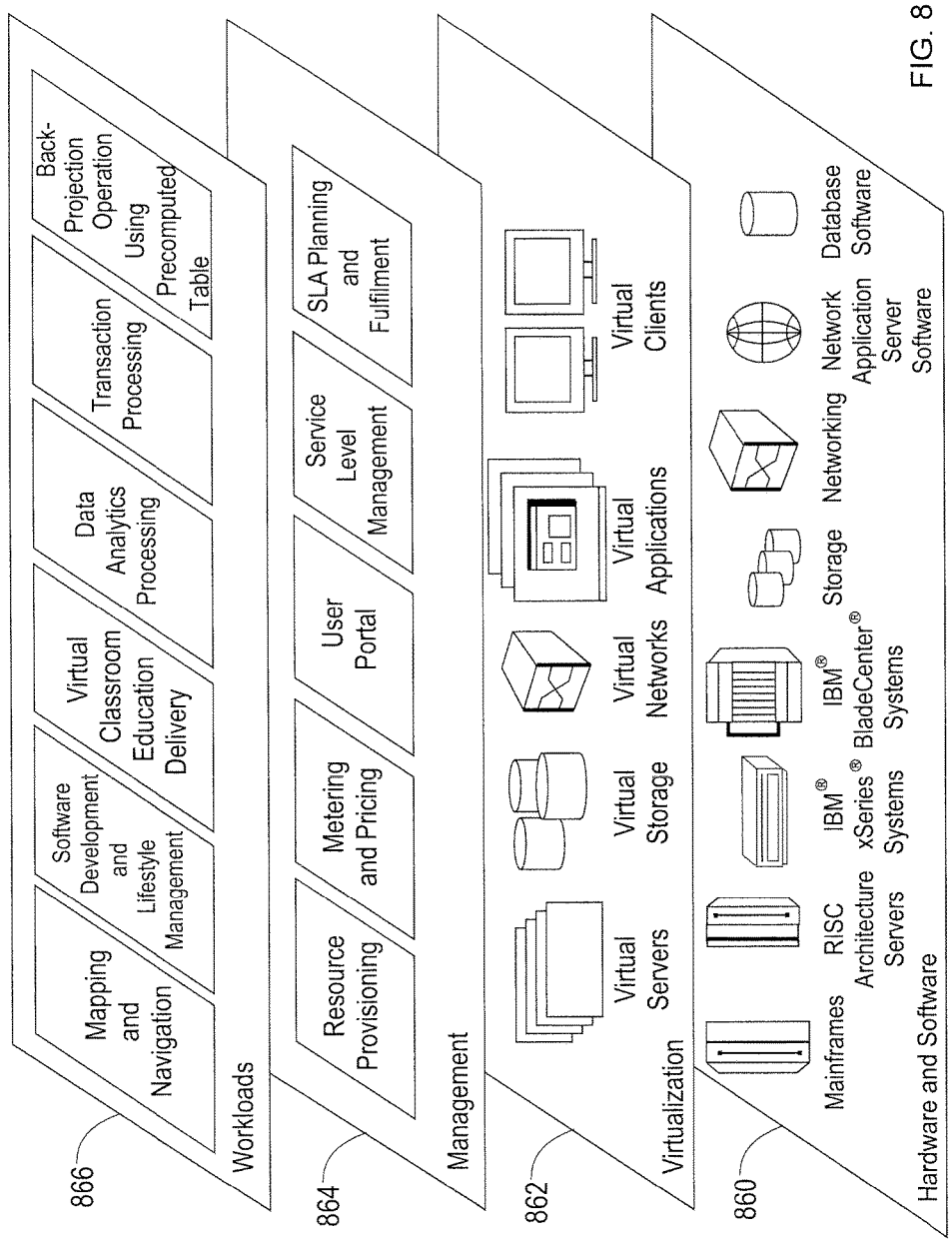
FIG. 8 shows exemplary abstraction model layers, in accordance with an embodiment of the present principles.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and an efficient back-projection operation using a pre-computed table.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
pre-computing, by a computing device having a processor, a plurality of coefficients for a given two-dimensional point on which a voxel of a three-dimensional object is projected, based on integer parts of coordinates of surrounding two-dimensional points with respect to the given two-dimensional point, the plurality of coefficients lacking inclusion of the coordinates;
storing, by a non-transitory storage device, the plurality of coefficients; and
computing, by the computing device during a back-projection operation that forms a reconstructed three-dimensional image, an intensity value at the given two-dimensional point;
wherein the computing device computes the intensity value by reading the plurality of coefficients from the non-transitory storage device and combining the plurality of coefficients with the coordinates;
wherein the method is performed by a Cone-Beam Computed Tomography system that includes the computing device and the non-transitory storage device.

2. The method of claim 1, wherein the plurality of coefficients are stored in a table structure in the non-transitory storage device.

3. The method of claim 1, wherein the plurality of coefficients are read from the non-transitory storage device using Single Instruction Multiple Data instructions to avoid scattered or unaligned memory accesses for the plurality of coefficients.

4. The method of claim 1, wherein a number of the plurality of coefficients to compute per two-dimensional point is 2N on an N-dimensional grid, where N is an integer denoting a number of grid dimensions of the N-dimensional grid.

5. The method of claim 1, wherein the given two-dimensional point is a non-grid point on a grid formed by or on a two-dimensional projection image.

6. The method of claim 5, wherein the plurality of coefficients are computed using the two-dimensional projection image.

7. The method of claim 5, wherein said computing step interpolates the intensity value at the given two-dimensional point using the plurality of coefficients.

8. The method of claim 5, wherein the given two-dimensional point is disposed within a perimeter formed by the surrounding two-dimensional points.

9. The method of claim 5, wherein the surrounding two-dimensional points consist of four grid points on the grid formed by or on the two-dimensional projection image.

10. The method of claim 5, wherein the plurality of coefficients are utilized in the back-projection operation to avoid accessing intensity values for the surrounding two-dimensional points from the two-dimensional projection image.

11. A non-transitory article of manufacture tangibly embodying a computer readable program which when executed causes a computer to perform the steps of claim 1.

12. A system, comprising:
a computing device having a processor for pre-computing a plurality of coefficients for a given two-dimensional point on which a voxel of a three-dimensional object is projected, based on integer parts of coordinates of surrounding two-dimensional points with respect to the given two-dimensional point, the plurality of coefficients lacking inclusion of the coordinates; and
a non-transitory storage device for storing the plurality of coefficients, wherein said computing device computes, during a back-projection operation that forms a reconstructed three-dimensional image, an intensity value at the given two-dimensional point, by reading the plurality of coefficients from the non-transitory storage device and combining the plurality of coefficients with the coordinates;
wherein the system is a Cone-Beam Computed Tomography system.

13. The system of claim 12, wherein a number of the plurality of coefficients to compute per two-dimensional point is 2N on an N-dimensional grid, where N is an integer denoting a number of grid dimensions of the N-dimensional grid.

14. The system of claim 12, wherein the given two-dimensional point is a non-grid point on a grid formed by or on a two-dimensional projection image.

15. The system of claim 14, wherein the plurality of coefficients are computed using the two-dimensional projection image.

16. The system of claim 14, wherein said computing step interpolates the intensity value at the given two-dimensional point using the plurality of coefficients.

* * * * *